US011468103B2

(12) United States Patent
Garlapati

(10) Patent No.: US 11,468,103 B2
(45) Date of Patent: *Oct. 11, 2022

(54) RELATIONAL MODELER AND RENDERER FOR NON-RELATIONAL DATA

(71) Applicant: Amazon Technologies, Inc., Seattle, WA (US)

(72) Inventor: Vikram Garlapati, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,131

(22) Filed: Dec. 21, 2018

(65) Prior Publication Data

US 2019/0121819 A1  Apr. 25, 2019

Related U.S. Application Data

(63) Continuation of application No. 13/608,215, filed on Sep. 10, 2012, now Pat. No. 10,169,446.

(51) Int. Cl.
*G06F 16/28* (2019.01)

(52) U.S. Cl.
CPC .......... *G06F 16/289* (2019.01); *G06F 16/284* (2019.01)

(58) Field of Classification Search
None
See application file for complete search history.

(56) References Cited

U.S. PATENT DOCUMENTS

| 6,553,371 | B2 | 4/2003 | Gutierrez-Rivas et al. |
| 9,483,537 | B1* | 11/2016 | Peters .................. G06F 16/284 |
| 2001/0018684 | A1* | 8/2001 | Mild .................... G06F 16/284 |
| 2004/0111410 | A1 | 6/2004 | Burgoon et al. |
| 2004/0249789 | A1 | 12/2004 | Kapoor et al. |
| 2005/0165866 | A1 | 7/2005 | Bohannon et al. |
| 2005/0283488 | A1* | 12/2005 | Colossi ................ G06F 16/283 |
| 2007/0016614 | A1 | 1/2007 | Novy |
| 2008/0065655 | A1 | 3/2008 | Chakravarthy et al. |
| 2008/0086442 | A1 | 4/2008 | Dasdan et al. |
| 2008/0168082 | A1* | 7/2008 | Jin ........................... G06F 8/20 |
| 2009/0177671 | A1* | 7/2009 | Pellegrini ............ G06F 9/5038 |

(Continued)

OTHER PUBLICATIONS

"Amazon DynamoDB (beta)" Whitepaper downloaded from the Internet aws.amazon.com/dynamodb/; on Jul. 2, 2012 Amazon Web Services LLC pp. 1-8.

(Continued)

*Primary Examiner* — Eddy Cheung
(74) *Attorney, Agent, or Firm* — Robert C. Kowert; Kowert, Hood, Munyon, Rankin & Goetzel, P.C.

(57) ABSTRACT

Methods and apparatus for a relational modeler and renderer for non-relational data are disclosed. In response to an indication of non-relational data sources, a relational data model based on one or more model inclusion criteria is generated to represent at least some contents of the non-relational data sources. In response to a model population request from a client, data obtained from the one or more non-relational data sources for one or more tables of the model is stored in cache storage allocated on behalf of the client. In response to a read-only operation request directed to the model, results of the read-only operation are obtained from the cache storage and provided to the requester.

20 Claims, 10 Drawing Sheets

(56) References Cited

U.S. PATENT DOCUMENTS

| | | | |
|---|---|---|---|
| 2010/0161555 A1* | 6/2010 | Nica | G06F 16/24561 707/624 |
| 2010/0241644 A1 | 9/2010 | Jackson et al. | |
| 2010/0325142 A1* | 12/2010 | Anzalone | G06F 16/00 707/769 |
| 2011/0087633 A1* | 4/2011 | Kreuder | G06F 16/273 707/610 |
| 2011/0246483 A1 | 10/2011 | Darr et al. | |
| 2011/0258179 A1 | 10/2011 | Weissman et al. | |
| 2012/0004891 A1 | 1/2012 | Rameau et al. | |
| 2012/0023141 A1 | 1/2012 | Holster | |
| 2012/0078974 A1 | 3/2012 | Meijer | |
| 2012/0109935 A1 | 5/2012 | Meijer | |
| 2012/0110004 A1 | 5/2012 | Meijer | |
| 2012/0130973 A1 | 5/2012 | Tamm et al. | |
| 2012/0131139 A1 | 5/2012 | Siripurapu et al. | |
| 2012/0158655 A1 | 6/2012 | Dove et al. | |
| 2012/0233194 A1 | 9/2012 | Ohyu et al. | |
| 2012/0310878 A1 | 12/2012 | Vuksan et al. | |
| 2013/0151491 A1* | 6/2013 | Gislason | G06F 16/2282 707/696 |
| 2013/0173664 A1 | 7/2013 | Xue et al. | |
| 2013/0238667 A1 | 9/2013 | Carvalho et al. | |
| 2013/0291098 A1 | 10/2013 | Chung et al. | |
| 2014/0012884 A1 | 1/2014 | Bornea et al. | |
| 2014/0025702 A1 | 1/2014 | Curtiss et al. | |
| 2014/0095549 A1 | 4/2014 | Shi et al. | |
| 2015/0019517 A1 | 1/2015 | Wang | |

OTHER PUBLICATIONS

"Amazon SimpleDB (beta)" Whitepaper downloaded from the Internet aws.amazon.com/simpledb/; on Jul. 2, 2012 Amazon Web Services LLC pp. 1-7.

"CA ERwin Data Modeler" downloaded from the Internet en.wikipedia.org/wiki/CA_ERwin_Data_Modeler; on May 9, 2012, Wikipedia®, pp. 1-2.

"Memcached" downloaded from the Internet en.wikipedia.org/wiki/Memcached; on Jun. 27, 2012 Wikipedia pp. 1-5.

Klint Finley "Towards a SQL-like Query Language for NoSQL Databases: UnQL" downloaded from the Internet www.readwriteweb.com/hack/2011/07/towards-a-sql-like-query-language.php; on Jul. 29, 2011 pp. 1-2, ReadWriteWeb.

Jonathan Ellis "What's New in Cassandra 0.8, Part 1: CQL, the Cassandra Query Language" downloaded from the Internet www.datastax.com/dev/blog/what's-new-in-cassandra-0-8-part-1-cql-the-cassandra-query-language; on Jul. 2, 2012 Datastax, pp. 1-7.

\* cited by examiner

RELATIONAL MODELER AND RENDERER FOR NON-RELATIONAL DATA

This application is a continuation of U.S. patent application Ser. No. 13/608,215, filed Sep. 10, 2012, which is hereby incorporated by reference herein in its entirety.

BACKGROUND

Relational database management systems (RDBMS) have been in wide use for decades. Relational databases have a number of characteristics that have led to their widespread use, especially for transaction processing systems. Such characteristics include the well-known support for ACID properties (atomicity, consistency, isolation and durability), as well as the backing of well-established vendors with a vast knowledge base and sophisticated tool sets that are useful in resolving many types of problems fairly quickly. A common technique for accessing and manipulating RDBMS data is to use SQL (Structured Query Language), a special purpose programming language designed for relational systems. The use of SQL is so widespread that it has almost become the default language for specifying database-related operations. Furthermore, the representation of data in the form of relational tables, in which each row has the same set of columns, is the data model that is most familiar to both IT (Informational Technology) technical professionals and business users.

More recently, and especially as the rate of data acquisition from such sources as web server logs or sensors has grown rapidly and exposed some scalability problems of relational databases, a number of non-relational approaches to data management have gradually started becoming more popular. Some of these approaches are collectively referred to as "NoSQL" databases, as they typically do not rely on SQL as their query language. Instead of using SQL, different non-relational database vendors have tended to use custom languages and interfaces. Many recent non-relational database systems typically promise excellent write performance, as well as distributed and fault-tolerant architectures designed to overcome some of the perceived shortfalls of traditional RDBMSs. These benefits are often achieved at the cost of relaxing some of the ACID constraints that are strictly enforced by RDBMSs.

In practice, the write performance of at least some non-relational databases indeed appears to be superior, at least with respect to equivalently-priced commercial relational database systems. However, as is often the case when a new type of technology begins to gain acceptance, the use of non-relational database systems has uncovered its own set of problems. For example, read performance often lags behind write performance in non-relational systems. A lack of standardization with respect to query languages for non-relational databases is another frequently-cited limitation. Tools to allow business users to analyze, understand and make use of the collected non-relational data easily have also yet to mature.

Figure 1A:
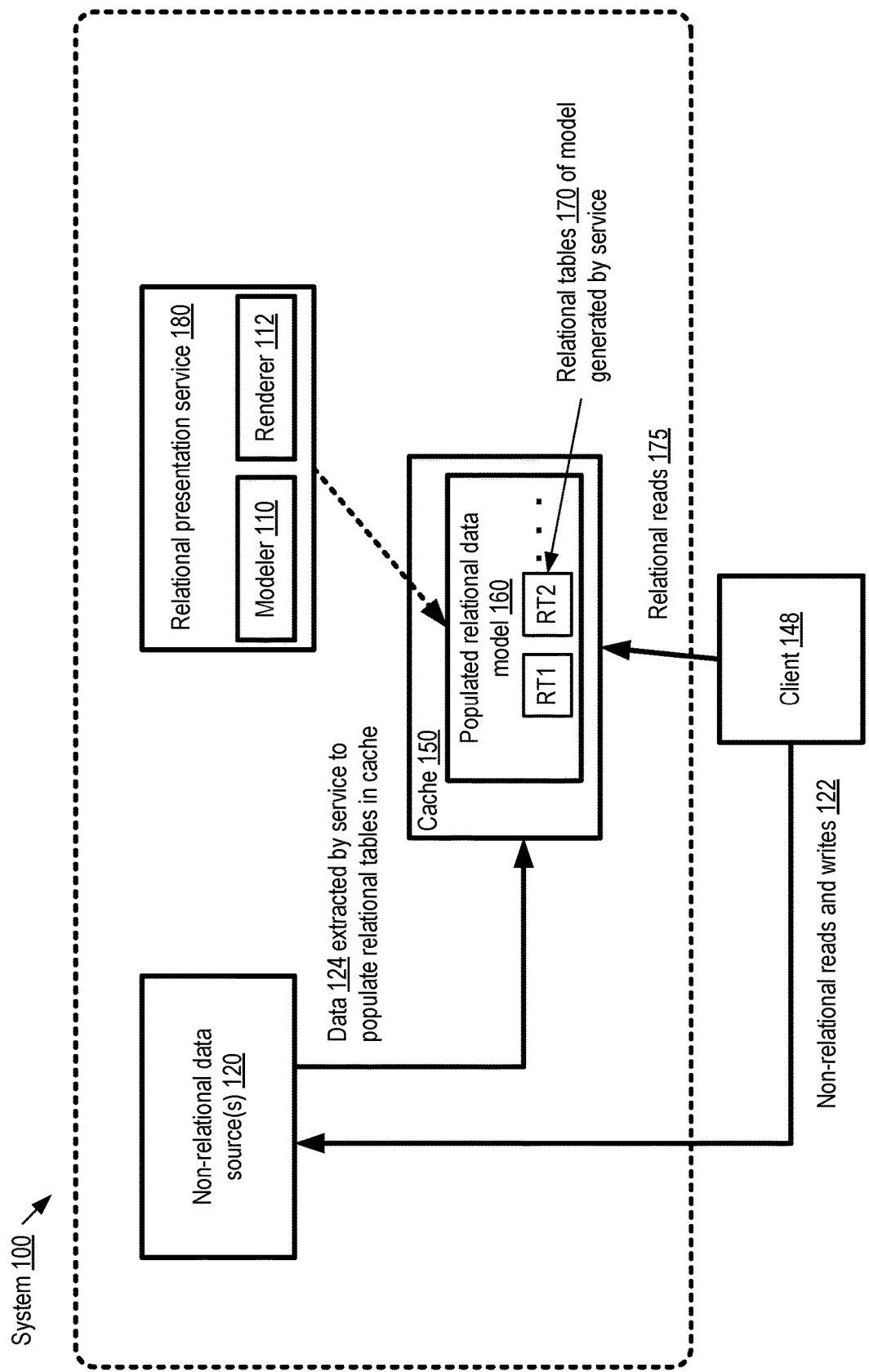
FIG. 1A illustrates an overview of an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for a relational modeler and renderer for non-relational data are described. As the rates at which potentially useful business data can be collected from sources such as web server logs, social media services, mobile devices, sensors and the like has grown dramatically over recent years, the use of non-relational databases designed to support scalable updates has gone up as well. Often, non-relational databases are implemented as key-value stores, in which values of a collection of attributes for an object can be written quickly, e.g., using a log-structured or write-once approach. Unlike relational database systems, which typically require all the rows within the same table to have the same columns, different objects stored within a non-relational equivalent of a table may in many cases have different columns or attribute types, and new columns may be created easily and efficiently on demand. Such non-relational databases, some of which are also referred to as NoSQL databases because they typically offer data access using interfaces other than SQL, may also offer other benefits such as built-in fault tolerance, flexible horizontal scaling across multiple execution platforms, and/or automated data partitioning across multiple storage devices to help support load balancing. However, depending on the particular non-relational database system being used, it may not be straightforward for users to perform the equivalent of some common relational operations, such as joins, queries that rely on indexes on attributes other than primary keys, view-based operations, or stored procedures. Further, in at least some implementations, the read performance supported by non-relational databases may be unsatisfactory, especially compared to the write performance.

According to at least one embodiment, a relational presentation service may be set up to provide a number of features supporting more effective interactions with non-relational data sets. The service may, for example, generate a relational data model from underlying non-relational data, extract content corresponding to the relational data model from the non-relational data sources, store the content in a fast read-only cache in the form of relational tables defined in the model, and allow client access to the cached data using relational interfaces (e.g., SQL-like interfaces). The service may be implemented as a distributed multi-tenant service in some environments, e.g., utilizing a number of network-accessible compute servers and storage servers, and providing clients a number of interfaces accessible over network connections. In at least one embodiment, the relational presentation service may be provided as an add-on feature or layer of a multi-tenant service supporting one or more non-relational database systems. That is, in such an embodiment, the clients of the non-relational database multi-tenant service may be given the opportunity to view selected portions or all of the non-relational data as a collection of relational tables, and to use interfaces supporting relational operators on the data of the relational tables.

For ease of implementation, the service may be logically divided into at least two major components in some embodiments: a relational data modeler, and a relational data renderer. These two components may be referred to herein as the modeler and the renderer respectively. The modeler may be responsible for generating the model, e.g., based on interactions with the clients such as business users, and/or based on automated analysis of operation records (for example, to discern logical relationships between different elements of the non-relational data that may be accessed frequently, and which might therefore be good candidates for inclusion in the model). The renderer may be responsible for populating the data model in cache storage on behalf of the client, i.e., for retrieving the relevant data elements from the non-relational data sources, storing them in relational tables in a persistent or in-memory cache, and providing interfaces allowing clients to perform read-only relational operations on the cached data. In some embodiments, the functionality of the modeler and the renderer may be combined into a single tool. Conversely, in some embodiments, the modeler and the renderer may be implemented as two different multi-tenant services, which clients access through separate interfaces and for which clients may even be billed separately. By providing the ability to view relevant non-relational data via relational models and interfaces with which clients are typically more familiar, the relational presentation service may make it significantly easier for business value to be extracted from the large volumes of non-relational being collected. Furthermore, at least in some embodiments, by isolating relevant data into read-only caches distinct from the underlying non-relational stores to which writes continue to be directed, excellent read performance may be obtained for various types of data analysis and report-generation tasks.

The modeler may, in one embodiment, receive an indication of one or more non-relational data sources from a client. A "non-relational data source", as used herein, may in general comprise any data storage and access system in which the data is not managed in accordance with the traditional relational model. Different non-relational data sources may support respective query languages and interfaces, which may in at least some cases not be compliant with the SQL standards used for relational databases. In some cases, a non-relational data source may not provide full ACID guarantees (atomicity, consistency, isolation and durability); for example, instead of strict consistency, "eventual" consistency may be supported, in which consistency is expected to be achieved given a sufficiently long period of time. The data may be organized into various types of logical groups in different non-relational data sources: for example, as key-value records with flexible column sets organized into collections, as documents represented in JavaScript™ Object Notation (JSON) or binary-format JSON (BSON), as XML (Extensible Markup Language) objects, as graphs or networks of objects, as directory-structured key-valued stores, and so on. A client may indicate one or more non-relational data sources to the modeler by providing, for example, a data source name and type, a network address, and/or credentials allowing access to at least some data objects of the stored non-relational data and/or associated metadata. In implementations where non-relational data elements are represented in aggregate form as documents, non-relational tables, graphs, or directories, for example, the term "non-relational data source" may be used to refer to an aggregate—e.g., two different non-relational tables maintained within the same non-relational database system may be considered two different data sources. In some embodiments the modeler may include respective subcomponents or plug-in modules capable of interacting with respective non-relational data sources—e.g., a subcomponent S1 may be able to analyze and extract data from a non-relational database provided by vendor V1, another subcomponent S2 may be able to interact with a second non-relational database implemented by vendor V2, and so on. In some implementations, several different non-relational databases from different vendors may be used within the same organization, and the modeler may be capable of generating relational data models using data from a plurality of different non-relational database data sources.

In order to determine exactly which subset of the data in the non-relational data sources is to be included in the tables of a relational data model, the modeler may rely on one or more model inclusion criteria in some embodiments. The criteria may include indications from a client indicating which portions of the non-relational data are of significance or interest, and what the relationships between the various data attributes of interest are. The modeler may provide one or more programmatic interfaces (e.g., a graphical user interface (GUI), one or more web pages or web sites, or application programming interfaces (APIs)) to allow clients to indicate data subsets and relationships of interest in some implementations. In at least one embodiment, the process of selecting which data elements from the non-relational data sets are to be incorporated into a relational data model may be at least partly automated. For example, the modeler may analyze records of operations directed to the non-relational data sources (e.g., query logs or transaction logs), and discern which portions of the non-relational data are frequently read, which types of queries are common, what types of logical relationships exist between various elements of the data, what the ranges in the values of various attributes are, and so on. Based on such analysis, in some embodiments the modeler may provide hints to the client regarding which data elements or attributes should be part of the model. In some implementations, the modeler may be capable of constructing at least an initial version of the entire model in an automated fashion, based on its analysis of operation records. Clients may use the programmatic interfaces provided by the modeler to view and edit the model, create new tables, define table columns, define cross-table relationships, and tailor the model appropriately, until an acceptable model version is obtained. A representation of the model may be stored in persistent storage by the modeler in some embodiments, e.g., either at client request or at the initiative of the modeler itself, without an explicit client request.

After a model has been created, at some stage the corresponding data may be extracted by the renderer from the non-relational data source or sources in various embodiments. In some embodiments, in response to a model population request from the client, the renderer may store data obtained from the one or more non-relational data sources (in the form of the relational tables of the model) within cache storage allocated on behalf of the client. In at least one embodiment, an explicit population request may not be required from the client; e.g., the modeler may trigger the renderer to start asynchronous model data extraction processes automatically when the model is saved. In many scenarios, the total amount of data to be extracted may be quite large, and data extraction may be speeded up by employing parallel data loader processes. In some implementations, a number of different compute servers and/or storage servers may be deployed, e.g., with one or more data loader instances being instantiated on each server. Various types of cache storage may be used in different embodiments—for example, in some cases, in-memory data structures (i.e., caches in volatile memory) may be used, while in other cases a given cache may use persistent storage, or a combination of persistent storage and in-memory data structures. For large data sets, distributed or multi-instance cache implementations may be used, with each instance using some combination of volatile memory and/or persistent storage. In some embodiments the client may be responsible for providing the renderer the location of the cache or caches to be used—e.g., network addresses of one or more storage devices and/or computing devices of the client may be provided. In other embodiments, the renderer may be configured to automatically identify or acquire the resources needed for the caches, such as one or more virtual or physical compute servers or storage servers from a cloud infrastructure provider. In at least one embodiment, the renderer may acquire some or all of the resources needed for the loader instances and/or the cache instances on behalf of the client, e.g., by submitting requests to a cloud infrastructure provider. In some embodiments, at least a portion of the functionality of the renderer may be performed using a relational database engine that may also be configured to support traditional relational database features. Such a relational database engine may, for example, be configured to extract data from non-relational data sources, and provide access to the extracted data as though the data were natively stored in the relational database systems in such embodiments. In some implementations, the cache into which the extracted data is stored may be shared with other data of the relational database engine. Any combination or subset of non-persistent or persistent memory used by the relational database engine (e.g., memory or storage configured for its traditional relational operations) may also be employed for the cache in such implementations. In other implementations, dedicated memory and/or storage may be set up to store the data extracted from the non-relational data sources.

After at least some fraction of the data has been loaded into the cache, in various embodiments the client may submit relational read-only operation requests targeted at the relational data model. Depending on the types of queries being issued and the total data set size, the client may not need to wait for the entire data set to be fully loaded before submitting at least some requests—e.g., if the client's queries are statistical in nature, or can be satisfied to different degrees of accuracy using sampling techniques. Supported operations may include any desired types of relational operations in some embodiments, such as select or project queries, joins, aggregate queries, stored procedures, view operations and the like. The renderer may implement one or more programmatic interfaces to allow such queries to be constructed and submitted in some embodiments, including at least some interfaces based on or derived from SQL. In some implementations, SQL operations may be fully supported, i.e., to the client, the interface to the cached data may appear no different than a standard SQL interface to a commercial RDBMS. When a read-only operation request is received, the operation may be performed on the cached data tables, and the results may be returned to the client. It is noted that clients may continue to submit non-relational write and read requests directly to the non-relational data sources in at least some implementations. Thus, in such implementations, the read-only relational interfaces provided to the cached data tables may serve as an alternative route to access the data, with the non-relational read interfaces still available for those clients that wish to use them.

In at least one implementation, the relational presentation service may, in addition to providing support for read-only relational operators on the generated data model, also support certain types of write operations, such as "tag" requests that allow clients to add additional metadata to the relational data of the model. Depending on the implementation, the service may pass on such writes to the underlying non-relational data sources, or may retain the updates in extensions to the read-only caches.

In one embodiment, the programmatic interface supported by the modeler may allow a relational table to be constructed whose columns are to be populated from a plurality of different non-relational data sources. E.g., using the interface, the client may decide that one attribute from non-relational table NRT1 should be represented as a column C1 of a relational table RT1 in the model, while a second attribute from non-relational table NRT2 should be represented as a second column C2 of RT1. NRT1 and NRT2 may themselves be part of respective, separate non-relational databases—e.g., NRT1 may be part of vendor V1's non-relational database system, and NRT2 may be part of vendor V2's non-relational database system, implemented using different techniques than V1's system. Clients may be permitted to identify logical relationships that cross multiple non-relational objects, and multiple non-relational databases, using the modeler's interface in such embodiments, and the modeler may incorporate data elements from disparate data sources representing the identified logical relationships into the model.

A number of different types of metadata may be stored for a given model in some embodiments. Such metadata may, in one embodiment, include any combination of the following types of information: a refresh policy for the model, indicating one or more criteria to be used to schedule retrieval of data from the non-relational data sources; minimum and/or maximum size of the cache storage; minimum and/or maximum number of devices among which the cache storage is to be distributed; maximum and/or maximum number of data loader processes to be instantiated to obtain data from the non-relational data sources; a retention policy indicating how long various types of data is to be retained in the cache storage; a replacement policy for data stored in the cache storage, indicating which cached elements are to be replaced when the cache becomes full and additional data is to be cached; or authorization information indicating access permissions to the cache storage and/or to the model itself. In some implementations, the renderer may be configured to determine the number of data loader processes to be instantiated to extract the data from the non-relational data sources based on one or more factors, and to instantiate the determined number of data loader processes or instances. The factors taken into account for determining the data loader process count may include, for example, one or more constraints indicated by the client (such as a total budget, or a total number of compute devices the client has allocated for data extraction), an estimate of a size of the data set to be extracted and stored in the cache storage, or a specified limit of the cache storage size. Similarly, in some implementations the renderer may also be configured to determine the characteristics of the cache to be used based on similar considerations, e.g., whether to use a distributed cache implementation or a single instance cache, whether to use in-memory or persistent cache instances, and/or how many cache instances to use for a distributed cache implementation.

Example System Environment

FIG. 1A illustrates a high-level overview of an example system environment, according to at least some embodiments. System 100 comprises a relational presentation service 180, including a modeler component 110 and a renderer component 112. A client 148 submits non-relational read and write requests 122 to one or more non-relational data sources 120. The modeler 110 generates a relational data model 160 representing at least a subset of the non-relational data, e.g., in collaboration with or at the request of the client 148. The model 160 comprises a number of relational database tables (each with a respective fixed number of columns) to be populated using data elements obtained from the non-relational data sources 120. The renderer extracts data 124 from the non-relational data sources in accordance with the model, and stores the extracted data in relational tables 170 (such as tables RT1 and RT2) within cache storage 150 allocated to the client 148. After the data has been extracted from the non-relational data sources 120 and stored in cache 150, the client 148 may submit relational read operations 175 (e.g., selects, projects, joins, and the like) targeted at the data model, and the operations are performed on the data in the cache. Non-relational reads and writes 122 from the client 148 may continue to be directed to the non-relational data sources 120 in the depicted embodiment, even after the model 160 has been generated and populated.

Figure 1B:
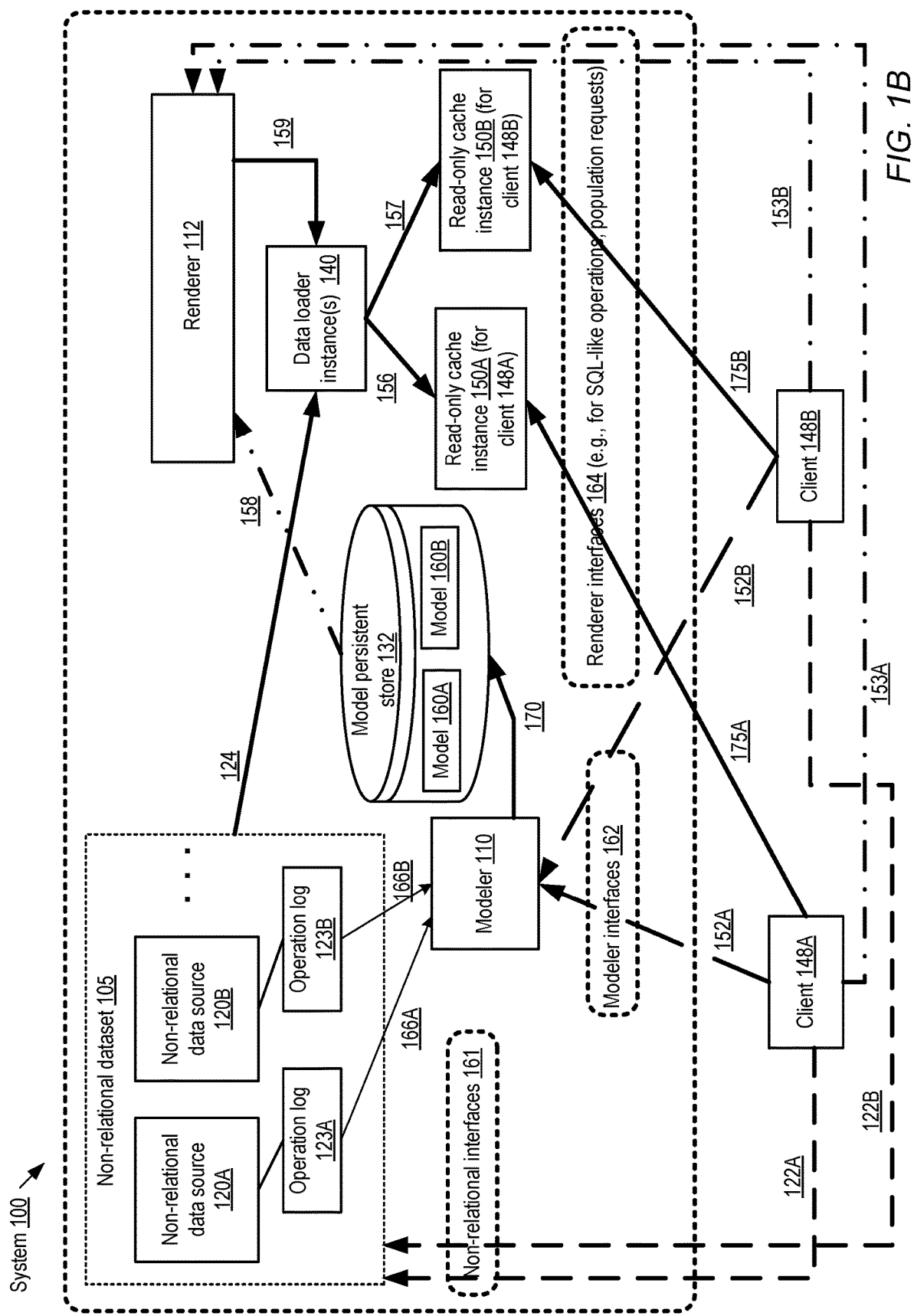
FIG. 1B illustrates a more detailed view of some of the elements of the example system environment depicted in FIG. 1A, according to at least one embodiment.

FIG. 1B illustrates a more detailed view of some of the elements of the example system environment depicted in FIG. 1A, according to at least one embodiment. As shown, non-relational dataset 105 of system 100 in FIG. 1B includes a plurality of data sources 120, such as 120A and 120B. Each non-relational data source 120 is depicted with a corresponding operation log 123 (e.g., log 123A for data source 120A, and log 123B for data source 120B), in which records of at least some of the read and write operations performed on dataset 105 on behalf of clients 148 (e.g., client 148A and client 148B) are maintained. Clients 148A and 148B submit read and write requests (indicated by the arrows labeled 122A and 122B) directed at the non-relational data set 105 via a set of non-relational interfaces 161.

In the depicted embodiment, modeler 110 of the relational presentation service implements one or more programmatic modeler interfaces 162 to support various types of model generation and editing interactions 152 with clients 148, such as interactions 152A with client 148A and interactions 152B with client 148B. Such interactions may for example include the client 148 indicating logical relationships between various data elements or attributes of non-relational dataset 105, so that the modeler 110 may represent the indicated attributes and relationships in the form of columns of relational tables. Modeler 110 may also be configured to analyze operation records from logs such as 123A and 123B, and to provide hints or suggestions to clients 148 regarding which data elements of non-relational dataset 105 should be included with relational models 160 based on results of the analysis. In some implementations the analysis may be restricted to the operations records of the client for whom the model is to be generated, while in other implementations records of a wider group of clients may be analyzed. A number of different heuristics may be used to determine which data elements or attributes should be recommended as candidates for inclusion in the model, e.g., in one implementation the attributes which are read most frequently may be recommended for inclusion. In another implementation recommendations or hints may be based at least in part on the range of values observed for a given attribute or column.

Modeler 110 may generate respective relational data models 160A and 160B for clients 148A and 148B in the depicted embodiment to represent at least a subset of the non-relational dataset 105 that is of interest to the clients in the form of various relational tables. Modeler 110 may store representations of the models in a model persistent store 132, as indicated by the arrow labeled 170. Each model 160 may include a respective plurality of relational database tables, where the tables and their constituent columns are determined by modeler 110 based on client input via interactions 152 and/or analysis of logs 123. The representations of the models within store 132 may include a variety of table definitions and metadata, as described below in further detail with respect to FIG. 4. After a model 160 has been generated and stored, the modeler 110 may notify the appropriate client 148 regarding the location of the stored model. For example, store 132 may be implemented using one or more network-accessible virtual or physical storage servers, and client 148A may be notified regarding the network address or URL (Universal Record Locator) at which the representation of model 160 can be accessed, the identifiers or keys to be used, and the credentials to be used.

After a model 160 has been created for a client 148, at some point the client 148 may submit a model population request to renderer 112 in the depicted embodiment, as illustrated by the arrows labeled 153, to initiate extraction of the data corresponding to the generated data model from the non-relational data source(s). Model population requests from client 148A are represented by arrow 153A, and model population requests from client 148B are represented by arrow 153B. Renderer 112 implements a set of programmatic interfaces 164, some of which may be used for the model population requests in some embodiments, while others may be used for read-only operation requests on the populated models. In some embodiments, the modeler 110 or some other entity may instantiate model population, i.e., explicit population requests may not be required from clients 148. A model population request may include, for example, an identification of the model 160 (by providing its name, unique identifier, and/or network address) and/or specifications of one or more caches to be used for the extracted data.

Upon receiving a model population request, the renderer 112 may access the specified model 160 from the model store 132 in the depicted embodiment, as indicated by the arrow labeled 158. The renderer may instantiate one or more data loader instances 140 to extract the data 124 corresponding to the model from the non-relational data sources 120. A data loader instance 140 may comprise one or more processes in the depicted embodiments, which may be executed using one or more computing devices such as virtual or physical servers. In some implementations, a data loader instance may be executed as part of the renderer 112 itself, e.g., as a subcomponent or as a thread of a multi-threaded renderer. The data loader instance(s) 140 may place the extracted data in respective caches 150A and 150B for clients 148A and 148B in the depicted embodiment, as indicated by the arrows labeled 156 and 157. Clients 148 may submit relational read operation requests directed at the models 160 via one of the interfaces 164 implemented by the renderer 112, as indicated by arrows 175A (for requests from client 148A) and 175B (for requests from client 148B) in the illustrated embodiment. The requested operations may be performed on the cached data, and the results may be returned to the clients 148 via interfaces 164. Some of the interfaces 164 may support operations formatted in languages such as SQL, or variants or derivations of SQL. In some embodiments, clients 148 may indicate whether the caches 150 need to be refreshed for a particular query or operation; if such a refresh is required, the renderer may direct the data loader instance(s) 140 to re-extract the data from the non-relational data sources 120. Clients 148 may continue submitting write and/or read requests 122 via non-relational interfaces 161 to the dataset 105. As a result, the data stored in the caches 150 may get stale over time; accordingly, in some embodiments, the renderer 112 may periodically instantiate data loaders 140 to re-extract the model data even if clients 148 do not explicitly request cache refreshes. In some embodiments a pool of executing data loaders may be maintained, e.g., instead of stopping and starting data loader processes or instances when data is to be extracted. In such an embodiment, the renderer 112 may identify which of the pool's loaders are to extract data from which non-relational source, and direct the identified loaders accordingly.

In some embodiments, clients 148 may specify details regarding the data loader instances 140 (such as the number of instances to be used, how frequently the data should be refreshed from the non-relational dataset 105, and so forth) and/or the caches 150 (e.g., whether in-memory caches should be used or persistent caches should be used, and whether multiple distributed cache instances should be used). Such parameters may be stored as part of the model metadata in store 132 in some implementations. In some embodiments, the parameters may be determined by the renderer 112, e.g., based on factors such as an estimate of the expected size of the data set, the compute and storage resources available to or allocated to the client, client budget constraints, and so on. In some embodiments, access to the models 160 and/or to the caches 150 may be shared by multiple clients 148—e.g., client 148A may allow client 148B to use a model 160A that was initially generated at the request of client 148A, and/or to access the data extracted to cache 150A in accordance with model 160A. Authorization settings for models and for model data may be stored as part of model metadata in some implementations. In at least some embodiments, as noted earlier, at least a portion of the renderer functionality may be implemented by a relational database system or service. In one such embodiment, for example, an enhanced version of a traditional relational database engine may be developed that is configurable to extract non-relational data as described above, store the extracted data in some volatile and/or non-volatile memory, and provide support for relational operations directed at the extracted data.

Client Interactions with the Modeler and the Renderer

Figure 2:
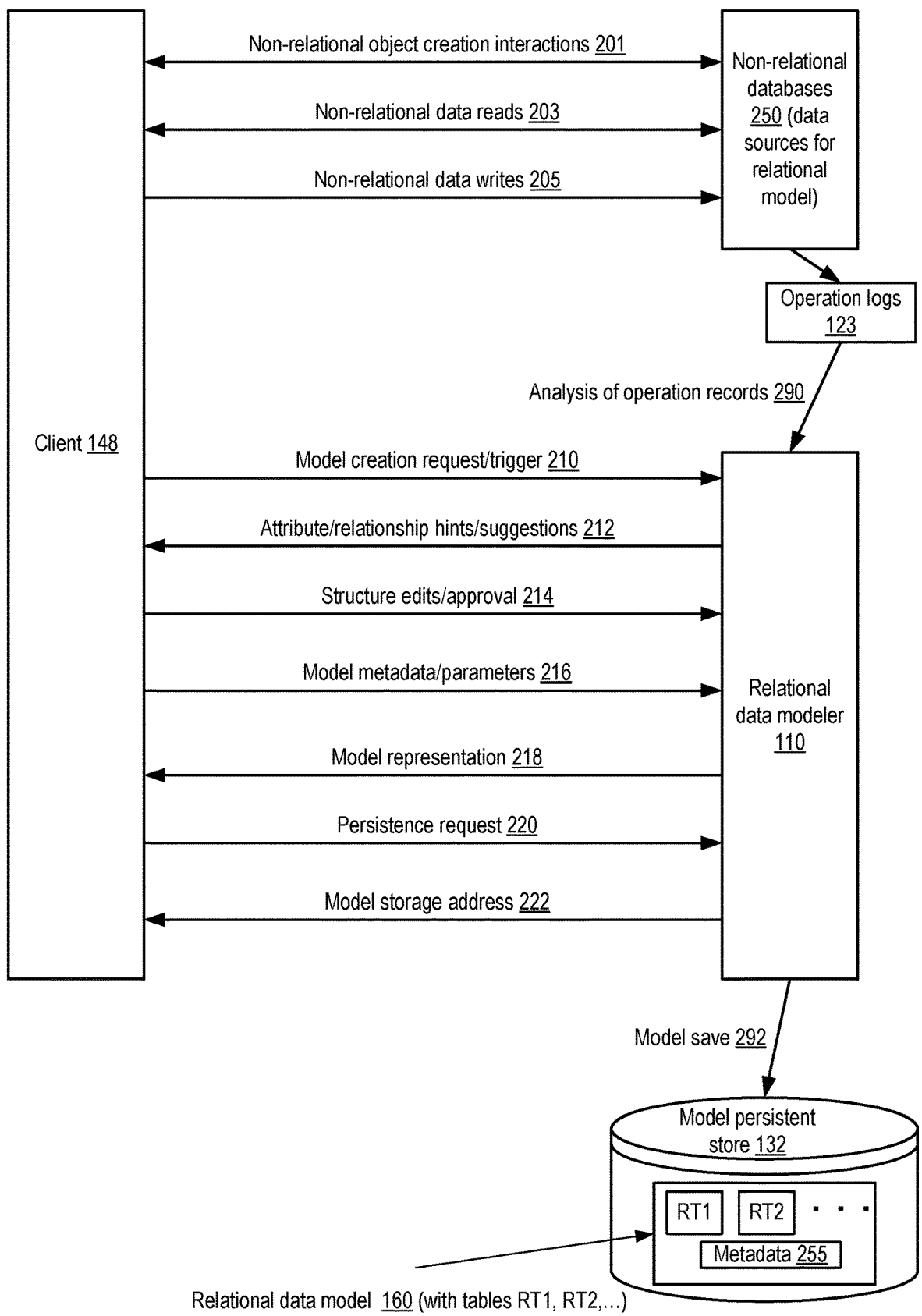
FIG. 2 illustrates example interactions between a client and a relational data modeler, according to at least some embodiments.

FIG. 2 illustrates example interactions between a client 148 and a relational data modeler 110, according to at least some embodiments. Examples of some interactions between the client 148 and one or more non-relational databases 250 (which may serve as the non-relational data sources 120 used to build relational data models 160) are also shown. As indicated by arrow 201, the client 148 may submit various requests associated with creating non-relational data objects such as documents, graphs, non-relational tables and the like to the non-relational databases 250. Having created the objects, the client 148 may proceed to submit read requests (as indicated by arrow 203) and/or write requests (as indicated by arrow 205) to the non-relational databases 250. Records of the read and/or write client-requested operations may be maintained in one or more logs 123.

Client 148 may submit a model creation request or trigger 210 to the modeler 110 in the depicted embodiment, e.g., using one or more programmatic modeler interfaces 162 shown in FIG. 1. The model creation request 210 may indicate one or more of the non-relational databases 250 to be used as data sources for the model; in some case, the client 148 may provide precise guidance as to the relational tables to be created and the contents to be assembled for the columns of the tables. In other implementations, the data model may be designed based at least in part on an analysis by the modeler 110 of the operations recorded in logs 123—e.g., the modeler 110 may recommend that data attributes that were read frequently should be included in the model, or that relationships deduced as a result of the analysis should be included. In the depicted embodiment, the modeler 110 may provide hints or suggestions about the data model design to the client 148, as indicated by the arrow labeled 212, which the client may accept or reject. In some embodiments, model generation may be triggered indirectly (instead of as a result of explicit model creation requests), e.g., a request for a particular type of report or analysis of the non-relational data may trigger the modeler 110 to suggest that a relational data model should be generated.

The process of building the model may be interactive in some embodiments. For example, the modeler 110 may begin by suggesting one or more tables, the client may review the suggestions and edit or modify the model structure or design, and so on, until the client is satisfied with the model and indicates approval (as depicted by arrow 214). The client may also provide any of a number of different model parameters (such as constraints on the size or type of the caches to be used, or filters used to limit the amount of data collected from the non-relational databases 250) which may be stored as elements of the model metadata, as indicated by arrow 216. The modeler may display or provide a representation of the model to the client 148, including for example a depiction of the relational tables and their columns and/or at least some of the metadata, as indicated by the arrow labeled 218. The client may review the representation and request that the representation be stored in a persistent store, as indicated by the arrow labeled 220. In response to the persistence request, the modeler may save the representation in a store 132, as indicated by arrow 292.

In some embodiments a representation may be saved in persistent storage even if the client 148 does not explicitly request such a save operation. The stored representation 160 may include definitions of various relational tables (e.g., RT1 and RT2) as well as model metadata 255 in some implementations. In some embodiments, where the stored model representation 160 is network-accessible, the modeler 110 may provide the client 148 with the address of the representation (e.g., a URL, or a hostname with an associated directory path), as indicated by the arrow labeled 222. Any credentials necessary to access the representation may also be provided to the client 148 in some embodiments. After the model 160 has been created and stored, the client 148 may in some embodiments be able to perform various operations on the model without further interactions with the modeler 110—e.g., the model representation may be stored in an editable format such as JSON, and the client may edit the model contents as needed. In other embodiments interactions with the model may have to be performed via one or more interfaces 162 implemented by the modeler 110.

Figure 3:
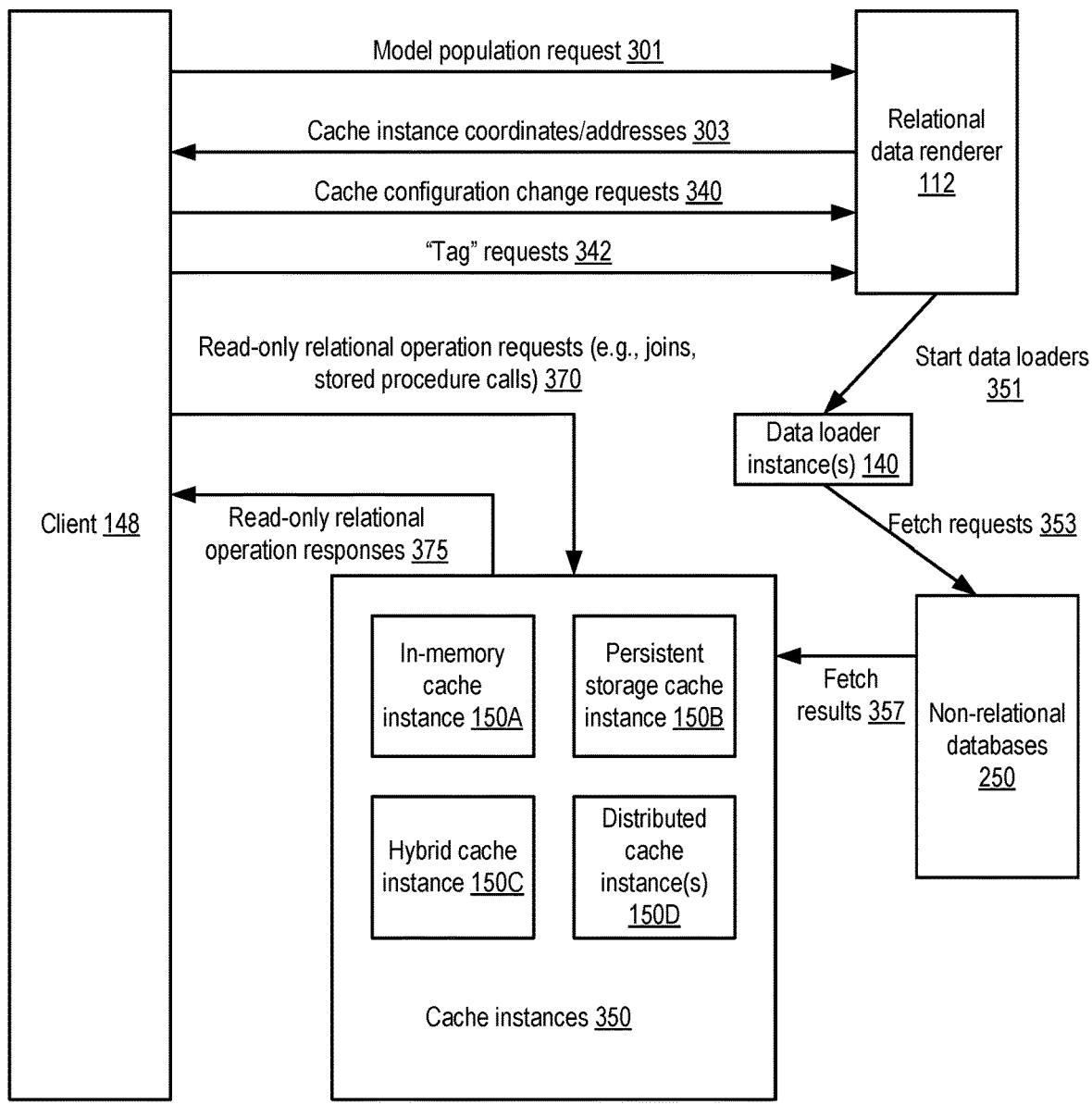
FIG. 3 illustrates example interactions between a client and a relational data renderer, according to at least some embodiments.

FIG. 3 illustrates example interactions between a client 148 and a relational data renderer 112, according to at least some embodiments. As shown, the client 148 may submit a model population request 301 to the renderer 112, e.g., using one of the renderer's programmatic interfaces 164 shown in FIG. 1. In some embodiments a model population request may be submitted by the modeler, e.g., when a model is saved to persistent storage, so that an explicit population request from a client may not be required. The population request 301 may include, for example, an indication of the model as well as parameters or preferences for loading the data. In response, the renderer 112 may develop a data load plan to extract the data corresponding to the model from the non-relational data sources. The plan may for example include the number of data loader processes or instances 140 to be used, and the types and locations of the destination caches. The renderer 112 may start the data loaders 140, as indicated by arrow 351, in the depicted embodiment. The data loaders 140 may submit data fetch (read) requests 353 to the non-relational databases 250 using the appropriate non-relational programmatic interfaces (such as the interfaces 161 of FIG. 1B). The fetch results 357 may be stored in one or more instances of cache storage 350. Different types of caches may be used in various embodiments, such as in-memory cache instances 150A, persistent storage cache instance 150B, hybrid cache instance 150C (which may comprise both in-memory and persistent caches), or distributed cache instances 150D. In some implementations, a plurality of cache instances, some of which use different storage types than others, may be used—e.g., a portion of the table data may be stored in persistent storage, while another portion may be stored in a distributed in-memory cache.

In some embodiments, e.g. in those embodiments where the cache instances are set up by the renderer 112, the renderer may provide the addresses or coordinates of the caches to the client 148, as indicated by arrow 340. Having received the location of the cache, the client 148 may submit read-only relational operation requests (such as queries of various types, joins, and the like) directed at the populated data model, as indicated by arrow 370. One or more programmatic interfaces 164 may be provided for the read-only requests in some embodiments, such as SQL or SQL-like interface, so that the relational operations can be specified using a well-known language. Responses to the requested operations may be obtained from the cache and provided to the client 148, as indicated by the arrow labeled 375 in FIG. 3. In some embodiments, clients 148 may submit certain types of write requests (e.g., requests to "tag" some of the contents of the model with user-generated labels) to the renderer 112, as indicated by the arrow labeled 342. Such tag requests may be passed on to the underlying non-relational databases 250 in some embodiments, where for example a tag may be represented using a new column. In other embodiments the renderer 112 may store tags in the cache or as part of model metadata, without necessarily transmitting the tags to the non-relational database.

Example Constituent Elements of Saved Model Representations

Figure 4:
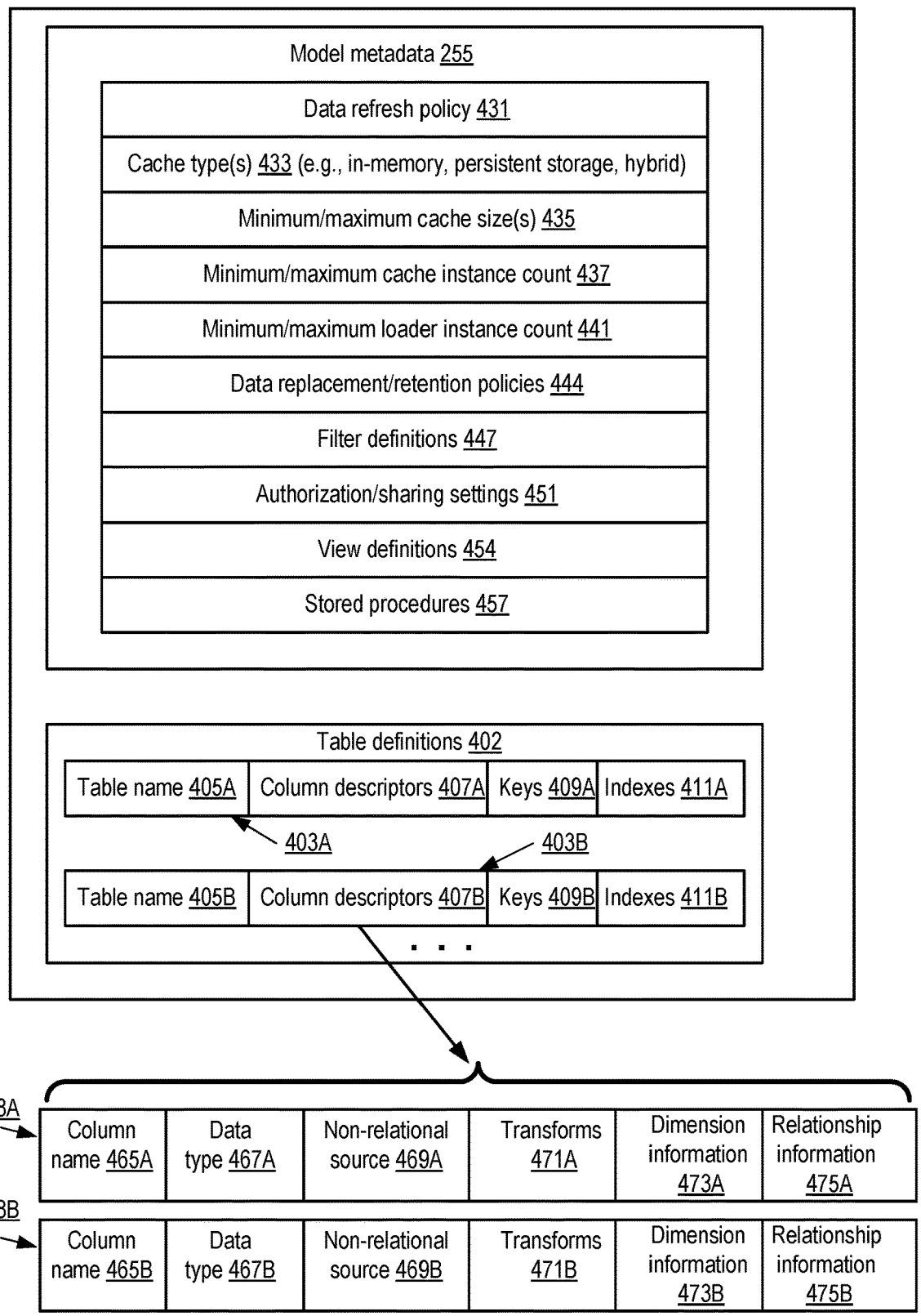
FIG. 4 illustrates examples of constituent elements of a representation of a relational data model generated at the request of a client, according to at least some embodiments.

FIG. 4 illustrates examples of constituent elements of a representation of a relational data model generated at the request of a client 148, according to at least some embodiments. As shown, the representation may comprise model metadata 255, and table definitions 402. The metadata 255 may include a number of different entries or fields. A data refresh policy 431 may be included in some embodiments, indicating criteria to be used to determine when to refresh the cached data from the non-relational data sources. For example, the client 148 may be willing to address its read-only operations to a slightly out-of-date version of the data in some embodiments, and may set a refresh policy 431 that re-extracts the data every X minutes or X hours. In some embodiments, the refresh policy 431 may indicate that the data is not to be re-extracted unless a client 148 explicitly demands a refresh. In other embodiments, the refresh policy 431 may indicate that the data is to be re-extracted for every read-only operation request received from a client.

Metadata 255 may include a cache type field 433, indicating the type(s) of caches to be instantiated to store the tables containing the extracted data. Several alternative cache implementations may be possible in some embodiments, such as in-memory caches, persistent storage caches, hybrid caches including both volatile and persistent storage, and distributed caches. Minimum and/or maximum cache size limits 435 may be specified in another metadata field in some embodiments. For distributed cache implementations, the minimum and/or maximum number of cache instances may be indicated by field 437.

In the illustrated embodiment, the minimum and/or maximum number of loader processes or instances to be executed in parallel may be specified via field 441. Data replacement and/or retention policies 444 may govern which cache entries are to be selected for replacement when the cache is full and additional data is to be added to the cache, or may indicate a time period after which cached data is to be discarded—e.g., depending on the kinds of read-only operations a client wishes to perform, data that is more than a week old may not be relevant, and therefore a retention policy may indicate that data should be purged from the cache after one week. The client 148 may also define other filters to restrict the set of data that is cached—e.g., the client may wish to cache data only for a subset of customers who have shopped at the client's web-based store more than five times in the past month, and a filter definition indicating this restriction may be stored in metadata field 447.

Authorization settings for the model and/or for the data extracted to populate the model may be stored in metadata field 451 in some embodiments. For example, the client on whose behalf the model is generated may wish to share access to the model with other members of the client's department, but disallow access from individuals that do not belong to the client's department. Similarly, the client may wish to allow some set of other clients to be able to submit read-only operations to the cached data corresponding to the model. In some embodiments, the metadata 255 may also include definitions of various kinds of relational operations and entities that may be expected to be re-used, such as view definitions 454 and stored procedures 457.

In at least some embodiments, either the client 148, the modeler 110, the renderer 112, or some combination of these entities may be responsible for generating and/or updating various metadata entries. The modeler 110 may for example generate default values for some or all metadata fields in some embodiments, and the client may edit the defaults as desired. In some embodiments, the modeler 110 and/or the renderer 112 may change some of the metadata fields in response to various factors, such as detected changes in the data set size, the types of operations being requested by the client, or the value ranges of the data attributes extracted from the non-relational data sources.

Table definitions 402 may include table descriptors 403 for the various relational database tables 170 defined in the model, such as table descriptors 403A and 403B. Each table descriptor 403 in turn may include a respective table name 405, a set of column descriptors 407, a set of key columns 409 identified for the table (e.g., keys that may be used for indexing purposes), and one or more index definitions 411 for indexes created for the table in some embodiments. A column descriptor set 407, such as column descriptor set 407B of table descriptor 403B, may include respective column entries 408 for each of the columns of the table. In the depicted embodiment, a column entry such as 408A may indicate the column name 465A, the data type 467A of the column's values (e.g., any of various numeric, character, or binary data types), and the non-relational source 469A (e.g., a specified non-relational column in a specified non-relational table or document) for the data values extracted to populate the column. In at least some implementations, a transformation function may need to be applied to the raw data extracted from the non-relational source before storing the data in the cache—for example, the non-relational data source may store numerical values as strings, and a string-to-floating-point conversion function may need to be executed to obtain the numerical value in a desired format for the relational data model. Indications of such transformation functions may be stored in elements 471 of the column entries 408 in the depicted embodiment (such as element 471A of column entry 408A, and element 471B of column entry 408B). In some embodiments, information about the dimensions of the data may also be stored with the column entries 408, as indicated by dimension information elements 473A and 473B for column entries 408A and 408B respectively. Dimension information may represent ways to categorize and/or label the data stored in the populated model into distinct regions or sets (e.g., data for different non-overlapping time periods, or for different geographical regions or demographics), which may be useful for filtering or grouping the data. In one embodiment, the column entries 408 may also include relationship information as well, indicating for example the logical relationships that exist with other columns of the same table or other tables. In the illustrated embodiment, respective relationship information elements 475 (e.g., elements 475A and 475B for column entries 408A and 408B respectively) may be implemented for some or all of the column entries 408. Various other types of information may be stored in the model representation in some embodiments, and some of the elements illustrated in FIG. 4 may be omitted (or organized differently than illustrated in FIG. 4) in other embodiments.

Methods for Modeler and Renderer Functionality

Figure 5:
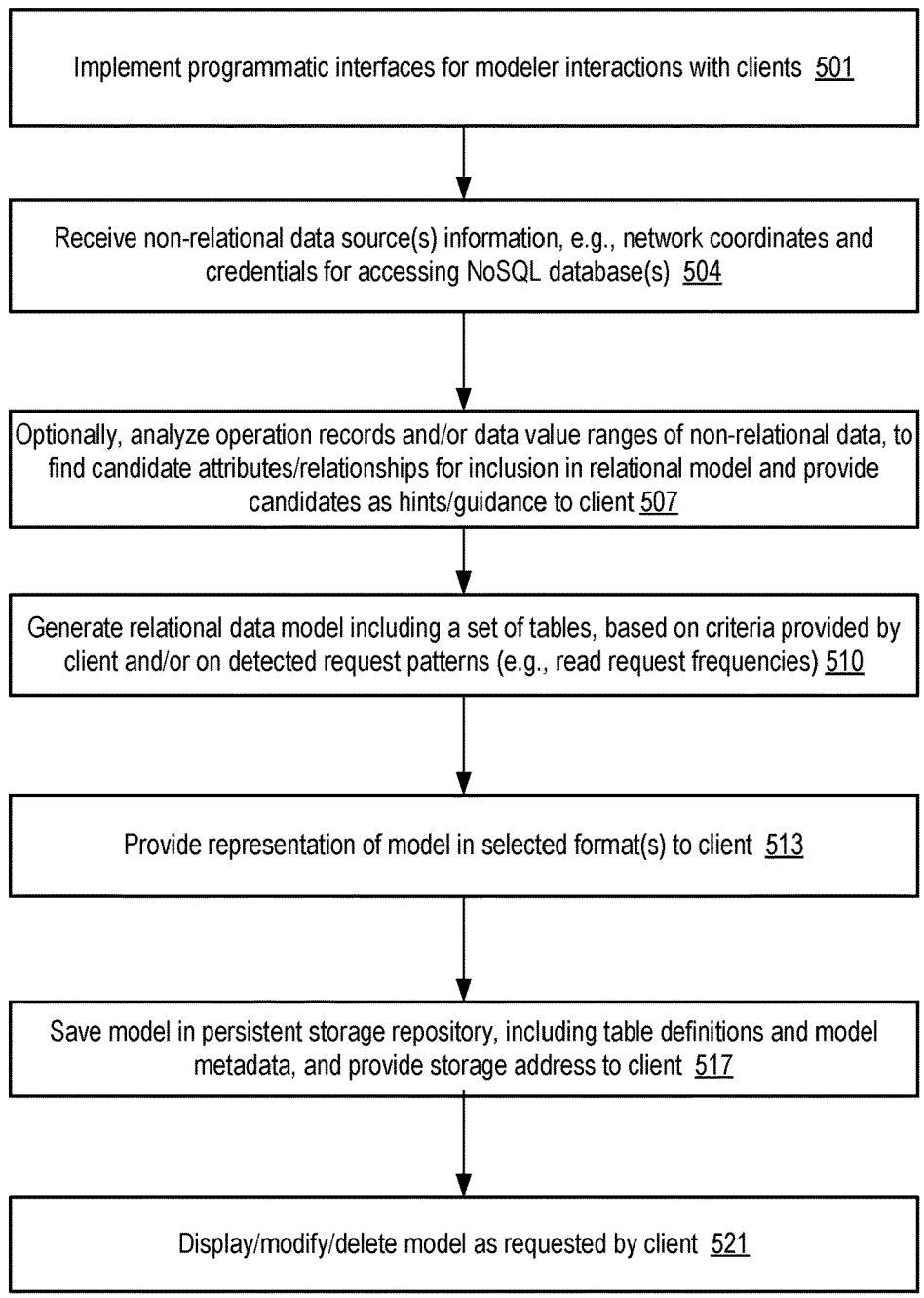
FIG. 5 is a flow diagram illustrating aspects of the operation of a relational data modeler, according to at least some embodiments.

FIG. 5 is a flow diagram illustrating aspects of operation of a relational data modeler 110, according to at least some embodiments. As indicated in element 501, the modeler may implement one or more programmatic interfaces (e.g., web-pages, a GUI, and/or APIs) for interactions with clients 148 in the depicted embodiment. The modeler 110 may receive information about non-relational data sources 120 via such interfaces, e.g., in the form of network addresses at which the data sources can be accessed, and/or the credentials needed for access, as shown in element 504.

In some embodiments, the modeler 110 may optionally analyze operation records (e.g., from logs 123) and/or the value ranges of various data elements stored in the non-relational data sources to find candidate attributes and relationships for inclusion within a relational data model (element 507 of FIG. 5). The modeler 110 may, for example, examine queries directed at the non-relational data, either just by the client on whose behalf the model is being generated, or by a plurality of clients, to identify frequently-accessed subsets of the non-relational data, and suggest to the client that such subsets be included in the model. In some implementations the modeler 110 may provide statistics to the client in support of its recommendations—e.g., the modeler may indicate to the client that queries to read attribute X of non-relational table A, and related attribute Y of non-relational table B, have been executed N times in the previous X days, and that as a result it might be worthwhile to create a relational table RT with columns representing X and Y.

The modeler 110 may generate a relational data model that includes a plurality of relational database tables, based on the client's requests or feedback and/or the modeler's analysis of operation records (element 510). In some implementations, after obtaining the access information for the non-relational data sources, the modeler 110 may generate the model independently, based largely or entirely on its analysis of operation records, without soliciting additional feedback from the client 148. Clients may provide guidance regarding the types of operations to be analyzed to generate the model in some embodiments, e.g., by instructing the modeler 110 to analyze only those records generated within a specified time period, or only those records directed towards a specified subset of the non-relational data. In at least some embodiments, model generation may comprise an iterative process in which for example the modeler generates an initial version of the model, which is then edited by the client, which is then followed by additional suggestions or hints from the modeler, followed by further editing and suggestion steps until a version of the model that is acceptable to the client is obtained.

In various embodiments, the modeler 110 may provide a representation of the model to the client 148 in one or more selected formats (e.g., as an image, an XML, document, or a JSON object) (element 513), during the editing interactions and/or when the model has been approved. A default format may be selected unless the client specifies one or more format preferences via the programmatic interface in some implementations. Either in response to a client request to save the model, or on its own as part of the model development process, the modeler 110 may save a representation of the model in a persistent storage repository (517) in some appropriate format (which may differ from the formats available to the client in some embodiments). The stored representation may include information about the model structure (such as table definitions 402 and column descriptor sets 407 of FIG. 4) as well as model metadata 255 in the depicted embodiment. The location where the model representation is stored may be provided to the client 148, e.g., as a file path on a specified host, as a URL, or using any addressing mechanism appropriate for the type if persistent storage devices used. In some embodiments, the modeler 110 may also provide the client with any credentials that may be needed to access the stored model and/or to modify the model. After the model has been stored and its address provided, the client may in some embodiments use the modeler to perform various additional operations on the model, such as to display the model in alternate formats, modify the model, or delete the model (element 521).

Figure 6:
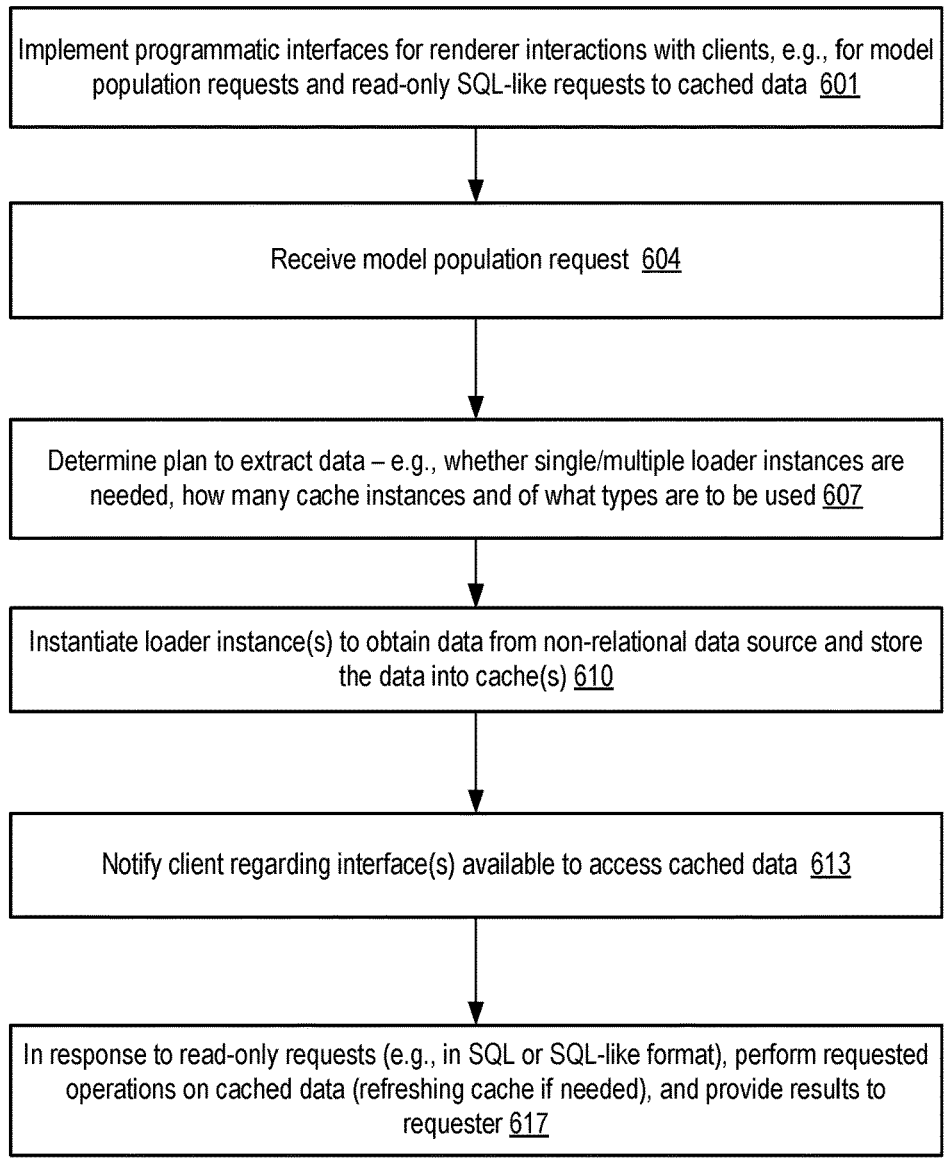
FIG. 6 is a flow diagram illustrating aspects of the operation of a relational data renderer, according to at least some embodiments.

FIG. 6 is a flow diagram illustrating aspects of the operation of a relational data renderer 112, according to at least some embodiments. As shown in element 601, the renderer may implement one or more programmatic interfaces (such as web pages, APIs, or GUIs) to allow clients to submit various kinds of requests, including for example model population requests, read-only operation requests on the cached data, cache refresh or reconfiguration requests, and so on. The renderer 112 may receive a model population request (element 604) from a client via one of the programmatic interfaces. In some embodiments the modeler 110 may itself submit a model population request, i.e., the modeler 110 may act as a client of the renderer 112 in such embodiments.

In response to receiving the model population request, in the depicted embodiment the renderer 112 may determine a plan to extract the required data from the non-relational data source(s) (element 607). The plan may include parameters such as the number and/or type of data loader instances or processes to be created, the number and/or type of caches to be used, or whether data partitioning techniques (e.g., range partitioning on some set of the columns of the relational tables, or hash partitioning) are is to be used for the cached data. Such plan decisions may be made based on any combination of several factors in various embodiments, such as the model metadata parameters, the renderer's knowledge of the size of the non-relational data from which attributes are to be extracted, the client's budget or resource constraints, request parameters included in the model population request, and the nature of the expected read-only operations to be performed on the data. In one scenario, the client 148 may wish to use virtual compute servers and/or virtual storage servers from a cloud infrastructure provider, and the number and capacity of compute servers and storage servers allocated to the client may be used to determine various details of the plan in such an embodiment. Alternatives for data loaders may include whether multiple threads within a single process are to be used, whether multiple processes on a single host or server are to be used, or whether multiple hosts or compute servers are to be used. Alternatives for cache types may include in-memory caches, persistent storage caches, distributed caches, or a combination of different cache types. In one simple implementation, the data load may be performed by the renderer 112 itself— e.g., a thread or component of the renderer may extract the data, and no additional processes or instances may need to be instantiated.

Having prepared the plan, the renderer 112 may instantiate the loader instance(s) or process(es) as needed (element 610), to extract the data for the relational tables from the non-relational data sources and store them in the designated cache(s). The client may be notified of the tools and/or interfaces available to access the caches (e.g., network addresses usable to access the caches and/or credentials allowing access to the cached data may be provided to the client), as shown in element 613. One or more of the interfaces in some embodiments may support operation requests formatted according to SQL or some variation of SQL. When read-only requests targeted at the relational data stored in the cache(s) are received, the operations may be performed on the cached data and the results may be provided to the requesting client (element 617). In some cases, either as a result of a refresh request included in the read-only operation request, or based on other factors such as an analysis of how recently the cached data was last extracted, the renderer 112 may refresh the data before performing the requested read-only operation. In some embodiments, e.g., based on the model metadata, the renderer may periodically refresh the data of the model, discarding or replacing cache entries as needed in accordance with the refresh policy, the data retention policy, and/or cache replacement policies.

It is noted that in some embodiments, the operations illustrated in FIG. 5 and FIG. 6 may be performed in a different order than that shown, and that some of the operations may be performed in parallel in some embodiments. Although separate figures have been used to illustrate the functions of the modeler and renderer, in some embodiments both sets of functions (i.e., those illustrated in FIG. 5 and those illustrated in FIG. 6) may be performed by the same process or computing device.

Example Web-Based Programmatic Interfaces

Figure 7:
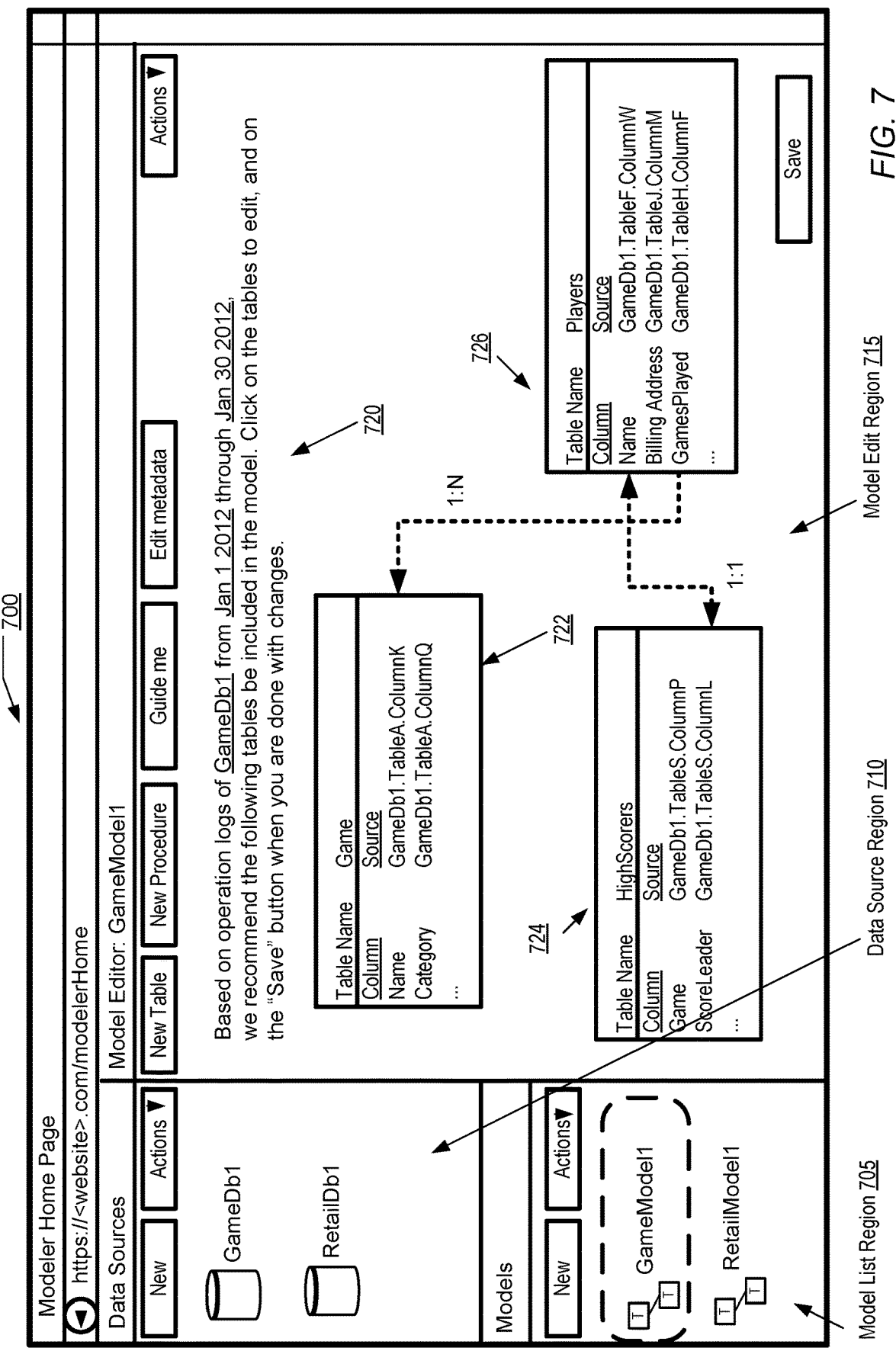
FIG. 7 illustrates an example of a web page interface that may be implemented for client interactions with a relational data modeler, according to at least one embodiment.

FIG. 7 illustrates an example of a web page interface that may be implemented for client interactions with a modeler 110, according to at least one embodiment. As shown, the interface may include a web page 700 that a client 148 may use to specify non-relational data sources, and to construct, edit and view relational data models to be populated using non-relational data extracted from the data sources. Web page 700 is divided into a number of regions. Data source region 710 shows the non-relational data sources that have already been identified, such as "GameDb1" and "RetailDb1". The client 148 may indicate additional data sources using the "New" button in region 710, and perform one or more actions on the data sources (such as renaming the data sources, changing the order in which the data sources are displayed, indicating various properties of the data sources such as the URLs and credentials needed to access them, or changing other properties of the data sources) using the "Actions" drop-down button in region 710.

Model list region 705 shows the models that have been generated (or are in the process of being generated), such as GameModel1 and RetailModel1. The dashed rounded rectangle around GameModel1 indicates that GameModel1 is currently selected, and as a result, details regarding Game-Model1 are shown in the model edit region 715. The client 148 may initiate the generation of additional relational data models using the "New" button in model list region 705, and perform various types of actions on the model list, such as reordering the list, editing model properties, renaming the models, and so on, using the "Actions" drop-down button in model list region 705.

Model edit region 715 displays a number of controls, as well as a graphical representation of some of the tables and relationships in the current version of the selected model GameModel1. New tables may be generated by clicking on the "New Table" button. New stored procedures may be generated using the "New Procedure" button. By clicking on the "Guide Me" button, a client may indicate that the modeler 110 should provide hints or suggestions regarding candidate tables, columns and relationships. As indicated in the message 720, the client in the illustrated web page has received suggestions from the modeler, based on operation logs associated with the GameDB1 non-relational data source for the indicated time period (January 1 through Jan. 30 2012). The suggestions include the three relational tables displayed: a "Game" table 722, a "HighScorers" table 724, and a "Players" table 724. For each suggested table, the modeler has provided a set of suggested columns (e.g., columns "Name" and "Category" in the "Game" table). For each suggested column, the modeler 110 has also provided the non-relational source from which the values for that column are to be extracted—e.g., the recommended source for Game.Name (the "Name" column of the "Game" table) is a non-relational column in GameDb1 identified as "GameDb1.TableA.ColumnK" (column K of a non-relational table named TableA). Relationships identified by the modeler between different table columns, such as the 1:N relationship between Players.GamesPlayed and Game-.Name are also indicated in the model edit region 715 via dotted arrows in the depicted embodiment. The client 148 may edit the suggested model structure, e.g., the tables or columns, contents of the columns, or edit the suggested relationships shown on the web page 700. The "Edit Metadata" button may be used to modify metadata associated with the currently selected model GameModel1. The current version of the selected model may be saved to persistent storage using the button labeled "Save".

Figure 8:
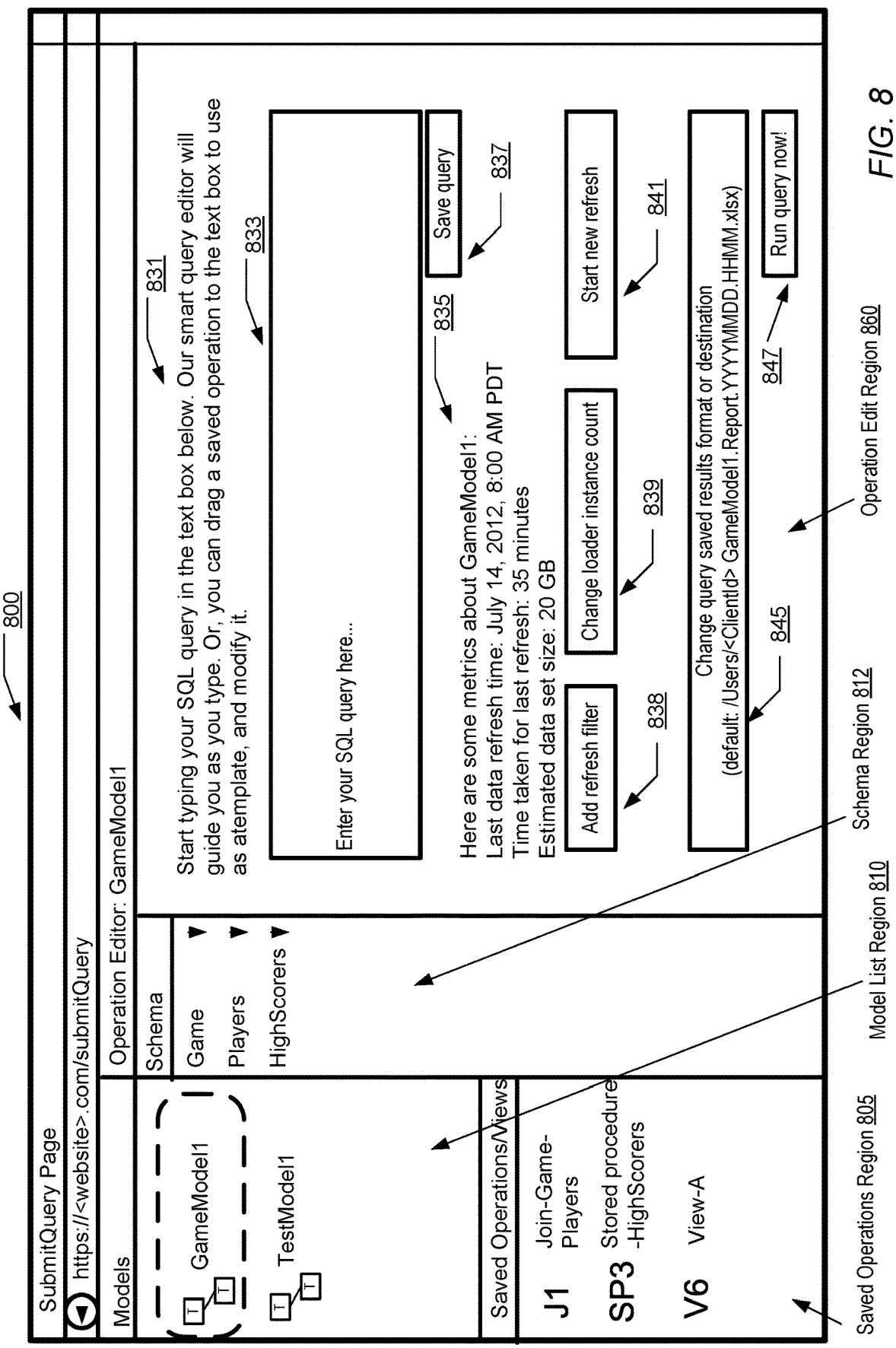
FIG. 8 illustrates an example of a web page interface that may be implemented for client interactions with a relational data renderer, according to at least one embodiment.

FIG. 8 illustrates an example of a web page interface that may be implemented for client interactions with a relational data renderer 112, according to at least one embodiment. The interface may include a web page 800 that allows clients to submit SQL-based queries directed at the relational data model. Web page 800 may include a model list region 810 displaying the generated relational models that can be queried, such as "GameModel1" and "TestModel1". A saved operations region 805 may display a list of some of the recently performed operations whose definitions have been saved for possible re-use, such as a join operation J1 ("Join-Game-Players", representing a join operation between the Game and Players tables), a stored procedure SP3 and a view operation V6.

The dashed rounded rectangle around GameModel1 in the model list region 810 indicates that GameModel1 is currently selected, and as a result, the operation edit region 860 and the schema region 812 indicate information pertaining to GameModel1. Schema region 812 lists the tables (e.g., "Game", "Players" and "HighScorers") of the selected model, and information about the columns of a given table may be obtained by clicking on the table name or on the drop-down arrows next to the table name in the depicted example web page.

Message 831 in the edit region 860 directs the client 148 to type an SQL operation in text box 833. As indicated in message 831, a smart query editor may be implemented in the depicted embodiment, e.g., to help ensure that the query entered by the client conforms to the schema of the selected model, and/or that the query does not contain SQL syntax errors. Operations specified by a client 148 may be saved using the "Save Query" button 837, e.g., for later re-use, and some of the saved queries may be displayed in region 805. Saved operations from region 805 may be dragged into text box 833 for modification or reuse.

In the depicted embodiment, in addition to allowing the client to specify SQL queries, renderer 112 may provide additional information and options to the client to help the client decide various parameters to be used in query execution. For example, in message 835, the renderer indicates some statistics about the selected model GameModel1, such as the last time the data for that model was refreshed, the time it took for the last refresh, and an estimate of the data set size of the model. If the client 148 wishes to add a refresh filter (e.g., to reduce the data set size based on some specified constraints), button 838 may be used. To change the number of data loader instances to be used for refresh, button 839 may be used. To initiate a new refresh to re-load the non-relational data, button 841 may be used. In some embodiments, the results of an executed read-only operation may be saved in a desired format in a desired storage location. As shown, the default or current format (in this example, a spreadsheet format in a file with an .xlsx extension) and result destination (in this example, a file in the client's home directory hierarchy) may be indicated on web page 700 via button 845. The client 148 may change the results format and/or location, also using button 845 in the depicted embodiment. To run the query types in by the client, button 847 labeled "Run query now!" may be clicked in the depicted embodiment.

A number of variations of the types of features illustrated in FIG. 7 and FIG. 8 may be implemented in different embodiments, and other types of programmatic interfaces, such as APIs, command-line tools, or non-web-based GUIs may be used for some subset or all of the features in other embodiments. In some embodiments, some of the functions of the modeler and renderer interfaces may be combined into a single interface, e.g., it may be possible to edit a model, load its data from the non-relational data sources, and ruin queries, using the same interface in some embodiments.

Use Cases

The techniques described above, of providing tools to help generate relational data models built on top of non-relational data, populating the relational data in read-only caches using a parameterized approach, and supporting relational operations on the populated models, may be useful in a number of different environments. They may be especially beneficial in corporate environments where the business users who have to obtain guidance for business decisions based on large collections of non-relational data are not yet fluent on the nuances of the non-relational databases being used, and are much more familiar with traditional SQL interfaces and relational tables.

In environments where the gathered non-relational data set is large, the ability to easily parallelize the data load process using multiple instances, and the ability to use distributed caches, may help to speed up the process of data analysis for various business users. These approaches may be applied very economically in environments where a cloud infrastructure provider implements the modeler and renderer (or even the non-relational databases) as multi-tenant services that can be deployed on inexpensive virtualized platforms.

Illustrative Computer System

Figure 9:
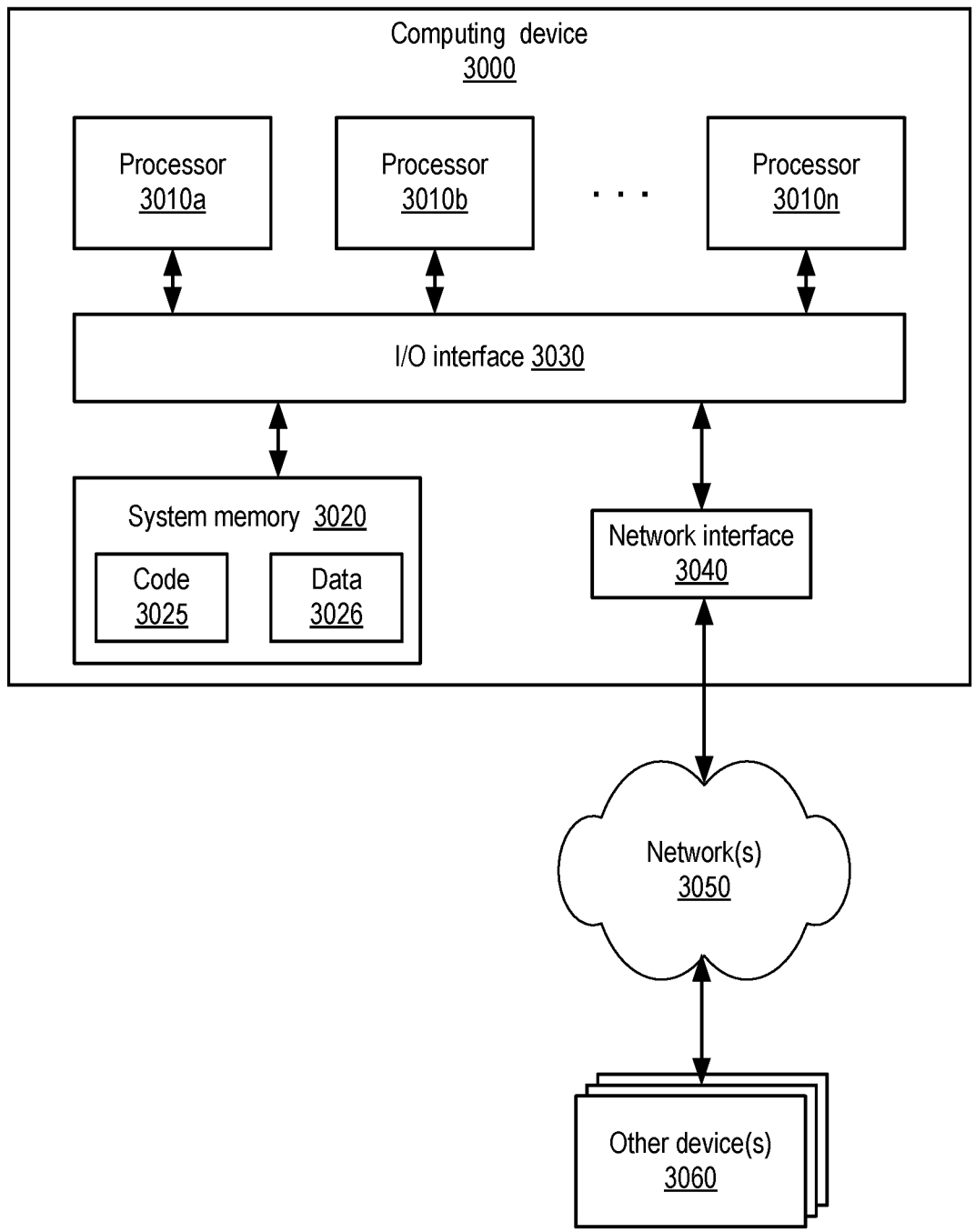
FIG. 9 is a block diagram illustrating an example computing device that may be used in some embodiments.

In at least some embodiments, a computer server that implements a portion or all of one or more of the technologies described herein, including the techniques to implement the functionality of the relational data modeler and renderer, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010

(e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1A through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1A through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement a relational data presentation service to provide, to a client of the relational data presentation service, read-only relational access to non-relational data stored by the client at one or more non-relational data sources, wherein the relational data presentation service is configured to:
identify one or more candidate data attributes based at least in part on an analysis of historical non-relational operations records comprising non-relational read operations previously requested via a non-relational interface from the client on the one or more non-relational data sources;
generate a model comprising a plurality of relational database tables collectively representing at least a portion of contents of the one or more non-relational data sources, wherein individual columns of respective ones of the relational database tables correspond to respective ones of the identified one or more candidate data attributes; and cause at least some of the non-relational data obtained from the one or more non-relational data sources to be stored within a cache storage, allocated for the plurality of relational database tables defined by the model, to populate a populated version of the model;
wherein the one or more non-relational data sources continue to be available to perform read operations and write operations from the client while the populated version of the model stored in the cache storage is available to perform read-only operations from the client directed to one or more of the plurality of relational database tables defined by the model.

2. The system of claim 1, wherein the relational data presentation service is further configured to:
cause one or more data loader instances to be instantiated to populate the model, wherein the one or more data loader instances are configured to:
extract data corresponding to the model from the one or more non-relational data sources; and
store the extracted data in the cache storage, allocated for the plurality of relational database tables defined by the model, to populate the populated version of the model.

3. The system of claim 2, wherein the relational data presentation service is further configured to:
determine a data refresh interval has been reached in accordance with a refresh policy associated with the model; and
cause the one or more data loader instances to refresh the populated version of the model, wherein to refresh the populated version of the model, the one or more data loader instances are configured to:
re-extract data corresponding to the model from the one or more non-relational data sources; and
store the re-extracted data in the cache storage allocated for the plurality of relational database tables defined by the model, to refresh the populated version of the model.

4. The system of claim 1, wherein the relational data presentation service is further configured to:
implement a programmatic interface allowing a client of the data presentation service to:
indicate the one or more non-relational data sources to be used to generate the model; and
indicate a logical relationship between a data attribute represented in a first one of the one or more non-relational data sources and a data attribute represented in a second one of the one or more non-relational data sources; and
generate the model such that the model comprises a first table with a column to represent the first data attribute and a second table with another column to represent the second data attribute.

5. The system of claim 1, wherein the relational data presentation service is further configured to:
implement a programmatic interface configured to receive from a client of the data presentation service an indication of the one or more non-relational data sources to be used to generate the model;
provide to the client a hint indicating the one or more candidate data attributes for inclusion in the model;
receive one or more selections from the client based on the hint; and
generate the model to represent at least a portion of contents of the one or more non-relational data sources in accordance with model inclusion criteria determined based on the one or more selections of the client.

6. The system of claim 1, wherein the data presentation service is configured to:
store the model in a persistent store; and
store metadata of the model in the persistent store, wherein the metadata comprises one or more of: (a) a refresh policy for the model, indicating one or more criteria to be used to schedule retrieval of data from the one or more non-relational data sources; (b) a maximum size of the cache storage; (c) a number of devices among which the cache storage is to be distributed; (d) a number of data loader processes to be instantiated to obtain data from the one or more non-relational data sources; (e) a retention policy indicating how long data is to be retained in the cache storage; (f) a replacement policy for data stored in the cache storage; or (g) authorization information indicating access permissions to the cache storage.

7. The system of claim 1, wherein the one or more non-relational data sources comprise a first non-relational database formatted in accordance with a format of a first database vendor and a second non-relational database formatted in accordance with a format of a second database vendor,
wherein the data presentation service is configured to generate the model using non-relational data from the first and second non-relational databases that are differently formatted.

8. A method, comprising:
identifying one or more candidate data attributes based at least in part on an analysis of historical non-relational operations records comprising non-relational read operations previously requested via a non-relational interface by a client on one or more non-relational data sources;
generating a model comprising a plurality of relational database tables collectively representing at least a portion of contents of one or more non-relational data sources stored by the client, wherein individual columns of respective ones of the relational database tables correspond to respective ones of the identified one or more candidate data attributes;
receiving a model population request from the client specifying the generated model; and
storing data extracted from the contents of the one or more non-relational data sources to a cache storage allocated for the plurality of relational database tables to populate the model;
wherein the populated model stored in the cache storage is stored distinctly from the one or more non-relational data sources such that the one or more non-relational data sources continue to be available to perform read operations and write operations from the client while the populated model stored in the cache storage is available to perform read-only operations from the client directed to one or more of the plurality of relational database tables defined by the model.

9. The method of claim 8, further comprising:
instantiating a plurality of data loader instances in response to receiving the model population request,
wherein said storing data extracted from the one or more non-relational data sources comprises:
extracting, by the plurality of data loader instances, data corresponding to the model from the one or more non-relational data sources; and
storing, by the plurality of data loader instances, the extracted data in the cache storage allocated for the plurality of relational database tables.

10. The method of claim 9, further comprising:
implementing the cache storage via a plurality of cache storage instances,
wherein the plurality of data loader instances perform, in parallel, said extracting the data corresponding to the model from the one or more non-relational data sources and said storing the extracted data to the plurality of cache storage instances.

11. The method of claim 9, further comprising:
determining a number of data loader instances to instantiate to populate the model based, at least in part, on:
a maximum or minimum number of data loader instances to be instantiated to populate the model, wherein the maximum or minimum number of data loader instances is a parameter configurable by a client of the relational data presentation service;
a size of a dataset to be extracted from the one or more non-relational data sources; or
a number of cache storage instances used to implement the cache storage.

12. The method of claim 8, further comprising:
implementing a programmatic interface allowing a client of the data presentation service to:
indicate the one or more non-relational data sources to be used to create the model; and
indicate a logical relationship between a data attribute represented in a first one the non-relational data sources and a data attribute represented in a second one of the non-relational data sources; and
generating the model such that the model comprises a first table with a column to represent the first data attribute and a second table with another column to represent the second data attribute.

13. The method of claim 8, further comprising:
implementing a programmatic interface to the relational data presentation service configured to:
receive from a client of the data presentation service an indication of the one or more non-relational data sources to be used to create the model;
provide to the client a hint indicating the one or more candidate data attributes for inclusion in the model; and
receive from the client one or more selected data attributes to be included in the model; and
generating the model such that the plurality of relational database tables defined by the model comprise the one or more selected data attributes.

14. The method of claim 8, further comprising:
refreshing the populated model in accordance with a refresh policy for the model, wherein refreshing the model comprises:
re-extracting data corresponding to the model from the one or more non-relational data sources; and
storing the re-extracted data in the cache storage allocated for the plurality of relational database tables defined by the model.

15. One or more non-transitory, computer-readable storage media storing instructions that, when executed on or across one or more processors, cause the one or more processors to implement a relational data presentation service configured to:
identify one or more candidate data attributes based at least in part on an analysis of historical operations records comprising non-relational read operations previously requested via a non-relational interface from the client on the one or more non-relational data sources;
generate, in accordance with model inclusion criteria determined based at least in part on the identified one or more candidate data attributes, a model representing at least a portion of contents of one or more non-relational data sources, stored by the client, in a plurality of relational database tables, wherein individual columns of respective ones of the relational database tables correspond to respective ones of the identified one or more candidate data attributes; and
receive a model population request specifying the generated model to be populated; and
store at least some of the non-relational data obtained from the one or more non-relational data sources to a cache storage allocated for the plurality of relational database tables to populate the model;
wherein the relational data presentation service causes a populated version of the model to be stored in the cache storage distinct from the one or more non-relational data sources such that the one or more non-relational data sources continue to be available to perform read operations and write operations from the client while the populated version of the model is available to perform read-only operations from the client directed to one or more of the plurality of relational database tables defined by the model.

16. The one or more non-transitory computer-readable storage media of claim 15, wherein the instructions, when executed on or across the one or more processors implement the relational data presentation service and configure the relational data presentation service to:
perform one or more refreshes of the populated version of the model in accordance with a refresh policy for the model.

17. The one or more non-transitory computer-readable storage media of claim 15, wherein the instructions, when executed on or across the one or more processors implement the relational data presentation service and configure the relational data presentation service to:
in response to a read-only operation request received from a client of the relational data presentation service, prior to completion of the model being populated, obtain results of the read-only operation from the cache storage for a table of the model that has been populated and provide the results to the client.

18. The one or more non-transitory computer-readable storage media of claim 15, wherein the instructions, when executed on or across the one or more processors implement the relational data presentation service and configure the relational data presentation service to:
store the model in a persistent store; and
store metadata of the model in the persistent store, wherein the metadata comprises one or more of: (a) a refresh policy for the model, indicating one or more criteria to be used to schedule retrieval of data from the one or more non-relational data sources; (b) a maximum size of the cache storage; (c) a number of devices among which the cache storage is to be distributed; (d) a number of data loader processes to be instantiated to obtain data from the one or more non-relational data sources; (e) a retention policy indicating how long data is to be retained in the cache storage; (f) a replacement policy for data stored in the cache storage; or (g) authorization information indicating access permissions to the cache storage.

19. The one or more non-transitory computer-readable storage media of claim 15, wherein the instructions, when executed on or across the one or more processors implement the relational data presentation service and configure the data presentation service to:

implement a programmatic interface allowing a client of the relational data presentation service to submit a request indicating a read-only operation directed to one or more of the plurality of relational database tables in a format based at least in part on Structured Query Language (SQL).

20. The one or more non-transitory computer-readable storage media of claim 15, wherein the instructions, when executed on or across the one or more processors implement the relational data presentation service and configure the data presentation service to:

determine a number of data loader processes to be instantiated to obtain the data from the one or more non-relational data sources, and cause the determined number of data loader processes to be instantiated.

\* \* \* \* \*